United States Patent [19]

Yamashita et al.

[11] Patent Number: 4,855,652

[45] Date of Patent: Aug. 8, 1989

[54] SPEED CONTROL APPARATUS FOR A BRUSHLESS DIRECT CURRENT MOTOR

[75] Inventors: Koujirou Yamashita, Hitachi; Stunehiro Endo, Hitachioota; Kunio Miyashita, Hitachi; Susumu Kashiwazaki, Utsunomiya; Kenichi Iizuka, Ashikaga, all of Japan

[73] Assignee: Hitachi, Ltd., Tokyo, Japan

[21] Appl. No.: 147,987

[22] Filed: Jan. 25, 1988

[30] Foreign Application Priority Data

Jan. 28, 1987 [JP] Japan .................................. 62-16104
Mar. 14, 1987 [JP] Japan .................................. 62-59733

[51] Int. Cl.$^4$ ............................................. H02P 5/28
[52] U.S. Cl. .................................... 318/268; 318/803; 318/811; 363/37; 388/838; 388/907
[58] Field of Search ........... 318/268, 318, 305, 345 A, 318/345 B, 800, 801, 802, 803, 805, 811, 341, 722, 723; 363/37

[56] References Cited

U.S. PATENT DOCUMENTS

| | | | |
|---|---|---|---|
| 4,047,083 | 9/1977 | Plunkett | 318/807 |
| 4,545,464 | 10/1985 | Nomura | 363/37 |
| 4,618,810 | 10/1986 | Hagerman | 318/803 |
| 4,656,571 | 4/1987 | Umezu | 363/37 |
| 4,767,976 | 8/1988 | Mutoh | 318/807 |
| 4,788,485 | 11/1988 | Kawagishi et al. | 318/811 |

Primary Examiner—William M. Shoop, Jr.
Assistant Examiner—G. J. Romano
Attorney, Agent, or Firm—Antonelli, Terry & Wands

[57] ABSTRACT

AC power supply is converted to DC by a rectifier circuit. The DC is stepped up by a step-up chopper circuit. The output of the step-up chopper circuit is smoothed by a smoothing circuit. The output of the smoothing circuit is input to an inverter via a current detecting circuit and a voltage detecting circuit. A synchronous motor is connected to the inverter. When the speed of the synchronous motor is judged to be in a high speed region based on the output signal of the voltage detecting circuit, the first speed control apparatus operates the interrupting control of the switching element of the step-up chopper circuit in such a manner that a deviation speed between an instruction speed signal to the motor and the detected speed of the motor reaches to zero. When the duty ratio of the inverter reaches to 100%, that is, when the speed of the motor reaches to a low speed region, the first control speed apparatus controls the switching element of the step-up chopper circuit based on the output signal of the current detecting circuit, and the second control speed apparatus carries out the pulse width modulation control of the inverter in such a manner that a deviation speed signal between an speed instruction signal to the motor and the detected speed of the motor reaches to zero.

3 Claims, 5 Drawing Sheets 4,855,652

SPEED CONTROL APPARATUS FOR A BRUSHLESS DIRECT CURRENT MOTOR

FIELD OF THE INVENTION

This invention relates to a speed control apparatus for a brushless direct current motor, more particularly, the present invention relates to a speed control apparatus which is suitable for controlling speed of the brushless direct current motor and utilizes a step-up chopper circuit and an inverter.

BACKGROUND OF THE INVENTION

In a prior art rectifier circuit, for example as shown in FIG. 4 of Japanese Patent Laid-Open Application No. 59-198872 published on Nov. 10, 1984 having the title of "Rectifying Power Supply Circuit", an alternating power supply is rectified and converted to a direct current power supply, and a higher harmonic wave of the power supply current is suppressed. Such a rectifier circuit has the switching element connected to the output terminal of the rectifier circuit and obtains the synchronous setting signal by multiplying the voltage signal of the alternating power supply and the difference signal between the direct current output voltage generated at the output terminal of the rectifier circuit and the setting voltage set previously, compares the synchronous error signal and the alternating current flowing through the rectifier circuit, and switches ON and OFF the switching element corresponding to the polarity based on the difference of the compared result.

The circuit of the prior art discloses that the load connected to the direct current power supply is controlled by the step-up chopper circuit, but it does not disclose that the step-up chopper circuit is further connected to an inverter and a motor as a load. Further, in the prior art rectifier circuit which uses the step-up chopper circuit, there is such a drawback that the magnitude of the direct current input voltage applied to the inverter is not controlled to the value which is lower than the peak value of the alternating current input voltage so that the speed control region of the motor becomes narrow.

SUMMARY OF THE INVENTION

An object of the present invention is to provide a speed control apparatus for a brushless direct current motor, which is simplified in the structure of the control circuit.

Another object of the present invention is to provide a speed control apparatus for a brushless direct current motor, which is able to control the motor in a wide range.

The object of the present invention is carried out as follows:

A control circuit of a synchronous motor of the present invention is formed in such a manner that a digital current instruction signal to the synchronous motor and an analog voltage signal of an alternating power supply are multiplied, and a switching element of a step-up chopper circuit is operated intermittently so as to make a synchronous current instruction signal obtained by the coincide with the power supply current.

When the digital current instruction signal of the control circuit is increased, the synchronous current instruction signal is increased, the deviation between the synchronous current instruction signal and the power supply current is increased, ON time of the switching element of the step-up chopper circuit is lengthened, and the power supply current is increased. Accordingly, the direct current voltage applied to the inverter is increased so that the speed of the motor is increased. The above operation is continued until the deviation reaches to zero. By changing the magnitude of the power supply current corresponding to the digital current instruction signal, the motor speed is able to be controlled.

According to the present invention, since the analog synchronous current instruction signal is produced synchronizing to the power supply voltage only by using a D/A converter with a multiplier, the control circuit is formed in a simplified circuit when the speed control procedure is effected by a microcomputer.

The object of the present invention is also carried out by the following first and second control means of the control circuit.

The first means carries out an interrupting operation of a switching element of the step-up chopper circuit based on a deviation velocity between an instruction velocity to the motor and a detected speed of the motor in a high speed region which is higher than a predetermined value.

The second control means carries out pulse width modulation (PWM) control in such a manner that a deviation velocity between an instruction velocity to the motor and a detected speed of the motor becomes zero at the inverter in a low speed region which is lower than a predetermined value.

In the high speed region, the deviation speed is increased by increasing the instruction speed, so that the current instruction signal and the synchronous current instruction signal are increased. Accordingly, the difference between the power supply current and the instruction signals is increased. As a result, since the ON time of the switching element is lengthened, the power supply current is increased. Thereby, the direct current voltage applied to the inverter is increased so that the speed of the motor is increased. This operation is continued until the deviation speed becomes zero. By changing the value of the power supply current corresponding to the deviation velocity, the speed of the motor can be controlled.

In the low speed region, the deviation speed is increased by increasing the instruction speed. By the PWM control at the inverter, the voltage applied to the motor is increased so that the speed of the motor is increased. This operation is continued until the deviation speed becomes zero, so that the speed of the motor is controlled.

DETAILED DESCRIPTION OF THE PREFERRED EMBODIMENTS

DETAILED DESCRIPTION OF THE PREFERRED EMBODIMENTS

Figure 1:
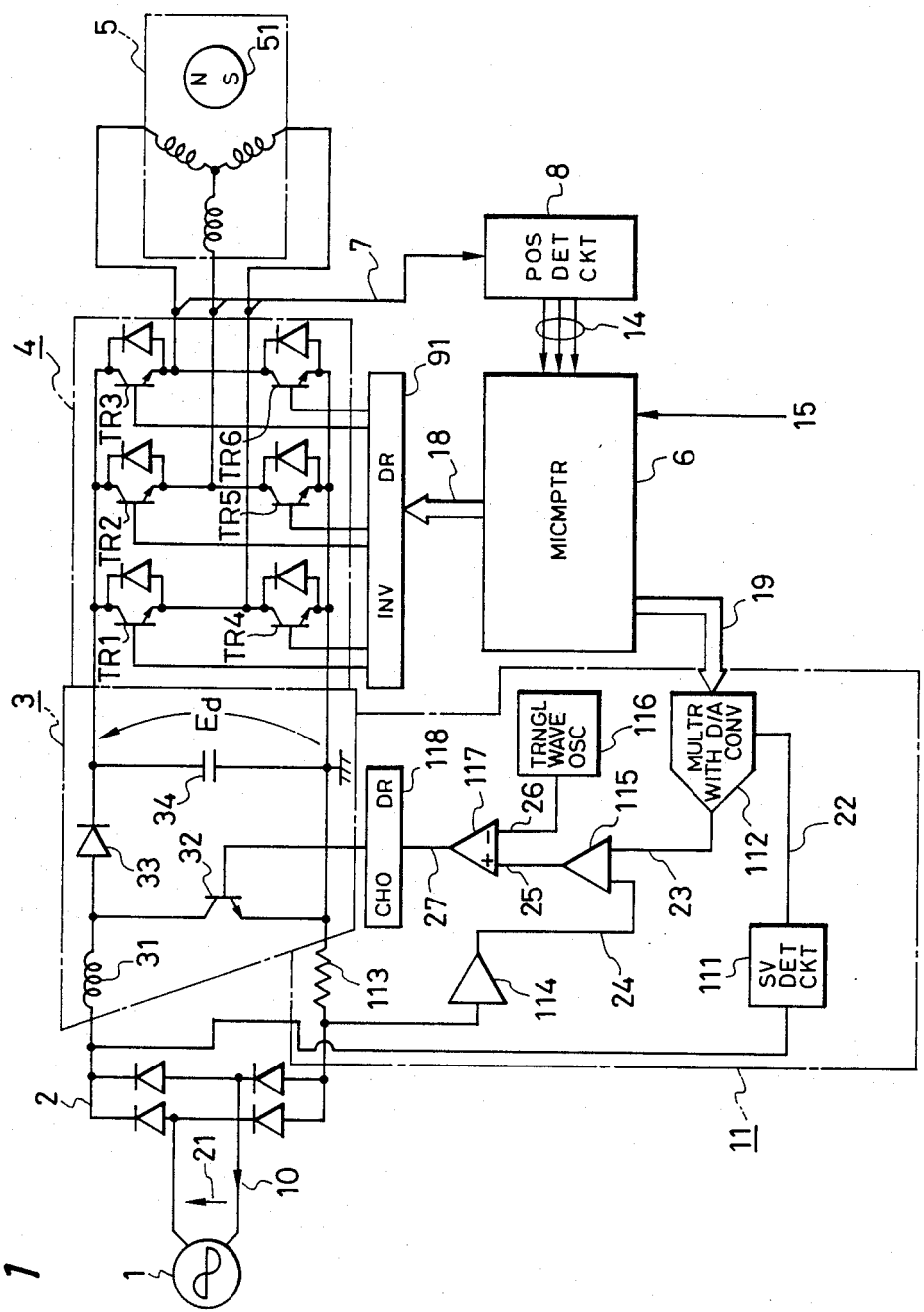
FIG. 1 is a block diagram showing one embodiment of a control apparatus for a brushless direct current motor of the present invention used in a high speed region.

Referring to FIG. 1, an alternating current (AC) power supply 1 is connected to an inverter 4 through a rectifier circuit 2, a step-up chopper circuit 3, and a smoothing condenser 34 as a smoothing circuit. A direct current (DC) electric power is supplied to the inverter 4 in such a manner that DC voltage Ed is applied to the inverter 4. A synchronous motor 5 is driven by the inverter 4.

A control circuit for controlling the speed of the synchronous motor 5 comprises a microcomputer 6, a position detecting circuit 8 for detecting a magnetic pole position of a rotor 51 of the synchronous motor 5 by the motor terminal voltage 7, an inverter driver 91 for outputting driving signal to transistors $TR_1$–$TR_6$ which constitute the inverter 4, and a power supply current controller 11 for controlling a waveform and magnitude of a power supply current 10.

The microcomputer 6, fetches different programs such as a program of speed control, which is necessary for driving the synchronous motor 5, the position detecting signal 14 output from the position detecting circuit 8, and a speed instruction signal 15; and which enables outputting of an inverter drive signal 18 to the inverter driver 91, and processing of a current instruction signal 19 to the power supply current controller 11.

The step-up chopper circuit 3 comprises a reactor 31, a transistor 32 as a switching element, and a diode 33. The drive signal to the transistor 32 is produced at the power supply current controller 11. By changing ON and OFF times of the transistor 32, the instantaneous magnitude of the power supply current 10 can be changed.

The step-up chopper circuit 3 of the present invention is not limited as shown in FIG. 1. In FIG. 1, the reactor 31 is connected between the rectifier 2 and the smoothing circuit 34. However, the reactor 31 may be connected between the power supply source 1 and the rectifier circuit 2. Although the number of the transistor 32 of the step-up chopper circuit 3 is one in FIG. 1, the number of the transistor 32 may be increased to two when the base of the two transistors are connected commonly to a chopper driver 118 of a power supply current controller 11, the emitters thereof are connected to earth, and the collectors thereof are connected to the output terminals of the power supply source 1, respectively. In such a connection, the diode 33 can be omitted, since the upper arms of the rectifier circuit 2 function as the diode 33.

Figure 2:
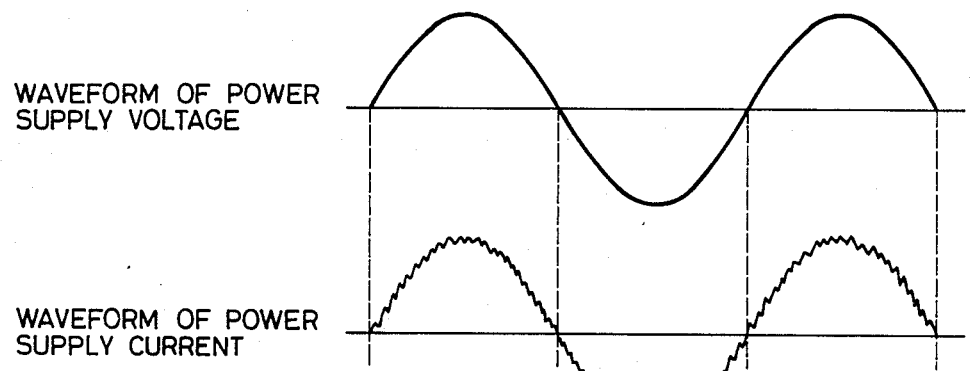
FIG. 2 is a waveform diagram showing a relationship between the power supply voltage and the power supply current.

The waveforms of voltage and current shown in FIG. 2 can be obtained by the following steps in that the power source current controller 11 and the step-up chopper circuit 3 are controlled so that the waveform of the power supply current 10 is a same phase sine wave as the power supply voltage 21, and the root mean square value representative of the magnitude of the power supply current is controlled corresponding to the current instruction signal 19 output from the microcomputer 6.

The power supply current controller 11 comprises a power supply voltage detecting circuit 111 for producing a voltage signal 22 having a rectified waveform which is synchronous with the power supply voltage based on the output voltage of the rectifier circuit 2, a D/A converter with multiplier for multiplying the voltage signal 22 and the current instruction signal 19 as a digital signal and producing a synchronous current instruction signal 23 as an analog signal, a power supply current amplifier 114 for amplifying full wave rectified current of the power supply current 10 detected by a resistor 113, a current control amplifier 115 for detecting a difference voltage by comparing a detected power supply current 24 which is an output current signal of the amplifier 114 and the synchronous current instruction signal 23 and effecting control so that the difference voltage becomes zero, a comparator 117 for comparing the error signal 25 output from the amplifier 115 and a triangle wave signal 26 output from a triangle wave oscillator 116 and producing a chopper signal 27 supplied to the transistor 32, and a chopper driver 118 for forming a signal supplied to the transistor 32.

The brushless DC motor of the present invention enables formation of the current instruction signal 19 as discussed below with reference to FIGS. 3 and 4.

Figure 3:
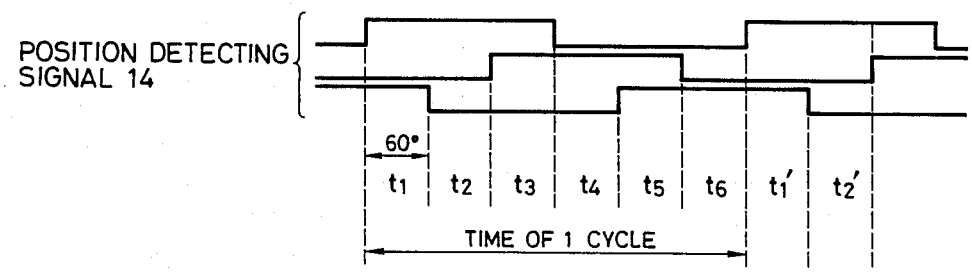
FIG. 3 is a timing chart showing a relationship among position detecting signal shown in FIG. 1.

Referring to FIG. 3, each phase of the three position detecting signals 14 is delayed by 60°. The microcomputer 6 measures times $t_1$–$t_6$ in each 60°, and obtains the time T of one cycle to detect the speed of the synchronous motor 5.

Figure 4:
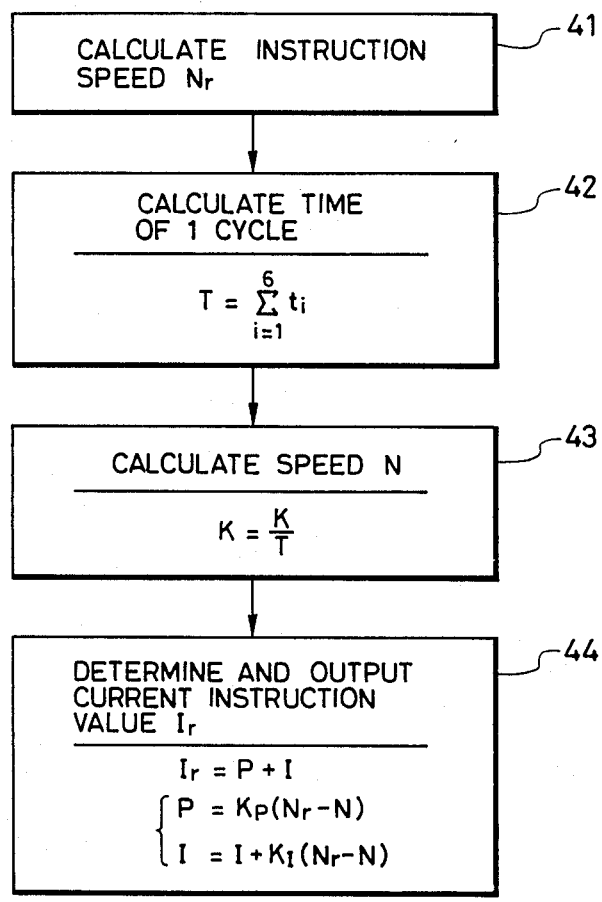
FIG. 4 is a flow chart for practicing the speed control procedure performed by a microcomputer shown in FIG. 1.

Referring to FIG. 4 which shows the steps for forming the current instruction signal 19, step 41 calculates an instruction speed signal Nr. based on the speed instruction signal 15 supplied from outside of the microcomputer 6. Step 42 obtains the one cycle time T of the position detecting signal. Step 43 calculates the rotational speed N of the motor based on the time T of the one cycle and a proportional constant K. Step 44 produces a proportional term P and an integral term I based on a deviation speed $\Delta N = Nr - N$ between the instruction speed Nr and the detected speed N of the motor, and obtains a current instruction signal Ir by adding the proportional term P and the integral term I. The current instruction signal Ir is output from the microcomputer 6 to the power supply current controller 11 as the current instruction signal 19. The proportional term P is produced by multiplying a proportional gain Kp and the deviation speed $\Delta N$, and the integral term I is produced by adding the product of an integral gain $K_I$ and the deviation velocity $\Delta N$ and the integral term I at the time.

By repeating and practicing the speed control procedure explained above, the current instruction signal is revised until the instruction speed signal Nr equals to the detected speed N, and the root square mean value of the power supply current 10 is determined.

According to the embodiment explained above, since the power supply current controller 11 is constructed chiefly by analog circuits, and the speed control procedure is carried out by the microcomputer 6, the transmission of the current instruction signal of the digital signal at the power supply current controller 11 is carried out by producing the synchronous current instruction signal of the analog signal which is synchronous with the power supply voltage using the D/A converter with multiplier 112 so that the control apparatus of the present invention is simplified. Since the inverter drive signal 18 controls the inverter 4 without using a PWM signal, the control circuit of the embodiment of the present invention can decrease the loss of the inverter and high harmonic component of the winding current of the synchronous motor, so that the control circuit of the present invention can improve the efficiency of the brushless DC motor to a high degree.

According to the present invention, as apparent from the explanation relating to FIG. 2, the control apparatus thereof can improve the power factor of the AC power supply.

Figure 5:
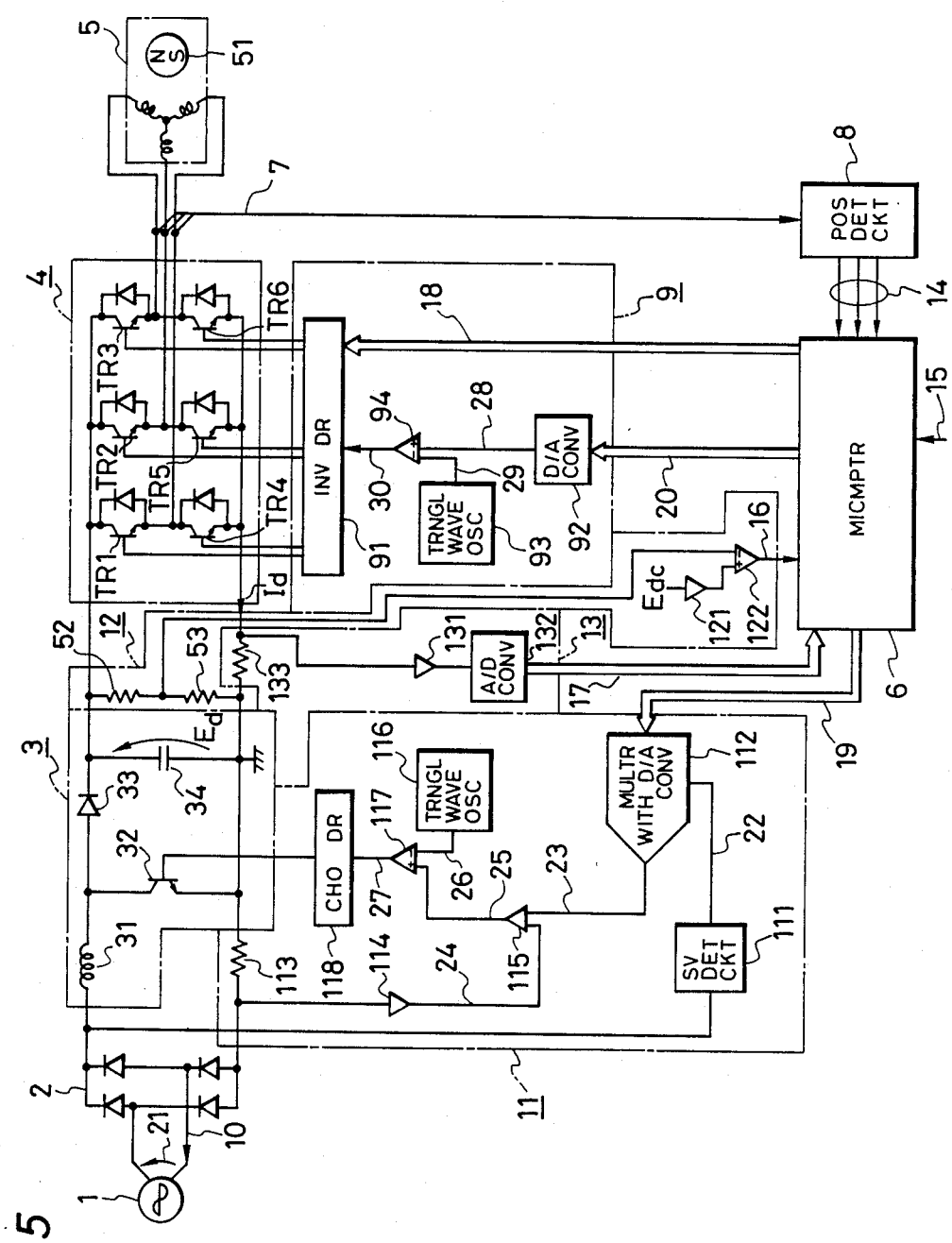
FIG. 5 is a block diagram showing another embodiment of a control apparatus for a brushless direct current motor of the present invention used in high and low speed regions.

Referring to FIG. 5, the same parts as shown in FIG. 1 are indicated by the same symbols.

Hereunder, a different structure from the embodiment shown in FIG. 1 will be explained referring to FIG. 5.

An inverter controller 9 comprises a D/A converter 92 for converting a voltage signal 20 as a digital signal output from the microcomputer 6 to an analog signal, a comparator 94 for comparing the voltage signal 28 output from the D/A converter and a triangle wave signal 29 output from a triangle wave oscillator 93 and for producing a chopper signal 30 to the inverter 4, and the inverter driver 91 for driving the inverter 4.

A DC current detector 13 comprises a DC current amplifier 131 for detecting a DC current Id by a resistor 133 and amplifying the detected current, and for an A/D converter for converting the output signal of the DC current amplifier 131 to a digital signal.

A DC voltage comparator 12 comprises a setting voltage amplifier 121 for amplifying a DC setting voltage Ed, and a comparator 122 for comparing the output signal of the setting voltage amplifier 121 and a DC voltage Edc detected by resistors 52 and 53.

The brushless DC motor equipped with a speed control apparatus shown in the embodiment of FIG. 5 has a feature that the control apparatus uses different control methods in the high speed region and the low speed region, and changes over the control of the motor from the high speed region to the low speed region and vice versa. The reason why the control apparatus uses different control methods in the high speed region and the low speed region and how to change over them will be explained hereunder.

The brushless DC motor can control speed by changing the output voltage of the inverter. The control methods are divided into the method of changing the DC voltage Ed and the method of PWM control by using the inverter. As the method of changing the DC voltage Ed, there is a method using the step-up chopper circuit. In this method, when the DC voltage Ed is lower than the peak value of the power supply voltage 21, the step-up chopper 3 is not operated near the peak value of the power supply voltage so that the power supply current 10 can not control in a sine wave. For controlling the speed of the motor in such a region, the inverter 4 has to be operated by PWM control. Therefore, it is necessary to use a different speed control method in the high speed region and in the low speed region. In the high speed region that the DC voltage Ed is always larger than the power supply voltage 21, that is, the DC voltage Ed is larger than the peak value of the power supply voltage 21, the control apparatus of the present invention carries out a DC voltage control using the step-up chopper circuit 3, and a PWM control by the inverter 4 is not effected. In the low speed region, the control apparatus of the present invention carries out a control so that the DC voltage Ed becomes a constant by using the step-up chopper circuit 3, and PWM control is effected by the inverter 4.

The changeover between the high speed mode and the low speed mode is carried out in such a manner that when the duty ratio by the PWM control of the inverter detected by the voltage signal 20 becomes 100%, the control is changed from the low speed mode to the high speed mode, and when the DC voltage Ed is smaller than the setting voltage Edc which is selected to have a larger value than the peak value of the power supply voltage 21, the control is changed from the high speed mode to the low speed mode. As apparent from the above explanation, the DC voltage comparator 12 is used for detecting the timing of changing over from the high speed region to the low speed region.

In the high speed control of the motor 5, the digital input signal to the A/D converter with multiplier 112 is the deviation signal between the speed instruction signal 15 and the speed signal calculated based on the position detecting signal 14.

In the low speed control of the motor 5, the digital input signal to the A/D converter with multiplier 112 is changed to the digital signal corresponding to the signal detected by the DC current detector 13 through the path 19 via the microcomputer 6 for the current, which corresponds to the demand of the synchronous motor 5 as a load, detected by the DC current detector 13 to the switching element 32 of the step-up chopper circuit 3.

The elements of 20, 92, 28, 29, 93, 94, and 30 in the inverter controller 9 are used for PWM control of the present invention. The waveform diagram shown in FIG. 2 and the timing chart shown in FIG. 3 are applied to the embodiment of FIG. 5 as well as that of FIG. 1.

Figure 6:
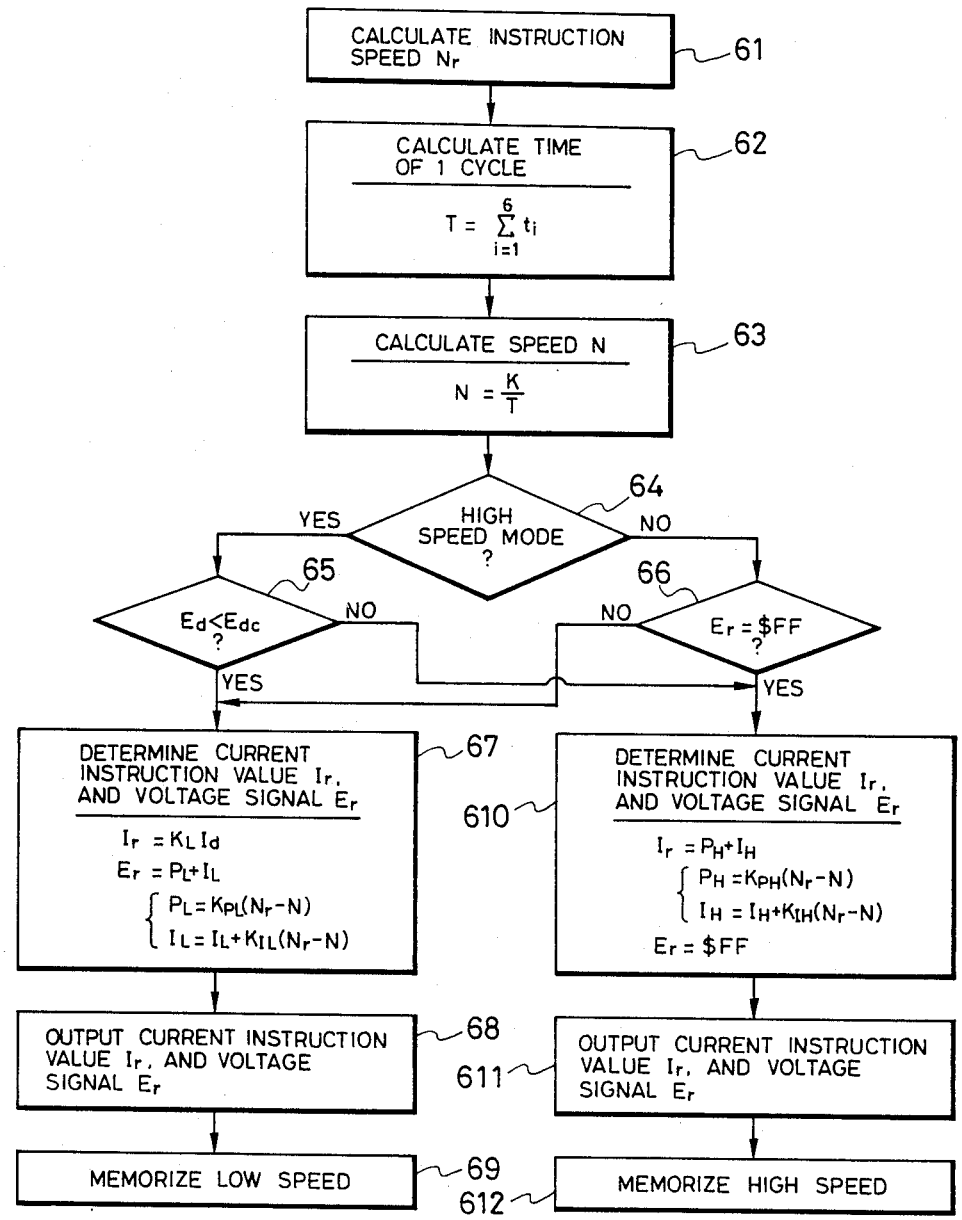
FIG. 6 is a flow chart for practicing the speed control procedure performed by a microcomputer shown in FIG. 5.

Referring to FIG. 6, the flow chart shows the procedures for forming the current instruction signal 19 and the voltage signal 20 to the inverter driver 91.

Step 61 calculates the instruction speed Nr based on the speed instruction signal 15 input to the microcomputer 6. Step 62 obtains the time T of one cycle based on the position detecting signal 14. Step 63 calculates the speed N based on the time T of one cycle and the proportional coefficient K. Step 64 judges the present mode. In the high speed mode, when the DC voltage Ed is smaller than the setting voltage Edc which is selected to have a larger value than the peak value of the power supply voltage 21, step 65 proceeds to step 67; and when the DC voltage Ed is larger than the setting voltage Edc, step 65 proceeds to step 610. In the low speed mode, when the voltage signal 20 to the inverter controller 9 is selected to take $FF in hexadecimal (corresponding to 255 in decimal system) in the duty ratio of 100%, and the voltage signal 20 (Er) is judged to be $FF by the microcomputer 6, step 66 proceeds to step 610; and when the voltage signal 20 to the inverter controller 9 is not $FF, step 66 proceeds to step 67. In step 67, the current instruction signal 19 (Ir in low speed control) is obtained by multiplying the DC current signal 17 (Id) and the proportional constant $K_L$; and the voltage signal 20 (Er) produces the proportional term $P_L$ and the integral term $I_L$ from the deviation speed $\Delta N = Nr - N$ based on the instruction speed signal Nr and the detected speed signal N, and Er is obtained by adding the proportional term $P_L$ and the integral term $I_L$. Wherein, the proportional term $P_L$ is produced by multiplying the proportional gain $K_{PL}$ and the deviation speed $\Delta N$, and the integral term $I_L$ is obtained by adding the multiplied value of the integral gain $K_{IL}$ and the deviation speed signal $\Delta N$, and the integral term at the time. In step 68, the current instruction signal Ir and the voltage signal Er are output. In step 69, the low speed is memorized to the memory (not shown) in the microcomputer 6. In step 610, the voltage signal 20 outputs $FF, and the current instruction signal 19 in high speed control outputs added valve of the proportional term $P_H$ and the integral term $I_H$. The proportional term $P_H$ is produced by multiplying the proportional gain $K_{PH}$ and the deviation velocity $\Delta N$, and the integral term $I_H$ is produced by adding the multiplied valve of the integral gain $K_{IH}$ and the deviation speed $\Delta N$, and the integral term at the time. In step 611, the current instruction valve Ir and the voltage signal Er are output. In step 612, the high speed is memorized to the memory (not shown) in the microcomputer 6.

By repeating and practicing the speed control procedure explained above, the detected speed N is controlled until it equals to the instruction speed Nr.

According to the embodiment explained above, since the speed control of the motor is carried out by using the step-up chopper circuit in the high speed region, PWM control by the inverter 4 is not necessary so that the loss of the inverter 4 is reduced and high harmonic component of the winding current is also reduced. In the region that the DC input voltage applied to the inverter 4 is smaller than the peak valve of the AC input voltage, that is, the low speed region in which speed control is impossible only by the step-up chopper circuit; since PWM control is carried out by the inverter 4, speed control in low speed region is possible and also speed control in wide region is able to be operated by the embodiment of the present invention.

What we claim is:

1. A speed control apparatus for a brushless direct current motor comprising:

rectifier circuit means for converting an alternating current of a power supply to a direct current;

step-up chopper circuit means for stepping up an output voltage of said rectifier circuit means and including a reactor, a switching element, and a diode;

smoothing circuit means connected to said step-up chopper circuit means for smoothing the direct current of said rectifier circuit means;

inverter means connected to said smoothing circuit means for conducting an alternating current in response to the direct current obtained at said smoothing circuit means;

a synchronous motor connected to said inverter means;

source voltage detecting means connected to said power supply for producing a voltage signal which is synchronous with a voltage of said power supply; and control circuit means for driving said inverter means and for switching ON and OFF said switching element of said step-up chopper circuit means, said control circuit means including means for generating a deviation velocity signal by subtracting a detected speed of said synchronous motor from an instruction speed therefor, means for generating a current instruction signal for making the deviation velocity signal become zero, and means for generating a synchronous current instruction signal by multiplying the current instruction signal and a voltage signal output from said source voltage detecting means, said control circuit means intermittently controlling said switching element of said step-up chopper circuit means based on a duty ratio necessary for making the synchronous current instruction signal coincide with said alternating current of said power supply.

2. A speed control apparatus for a brushless direct current motor comprising:

rectifier circuit means for converting an alternating current of a power supply to a direct current;

step-up chopper circuit means for stepping up an output voltage of said rectifier circuit means and including a reactor, a switching element and a diode;

smoothing circuit means connected to said step-up chopper circuit means for smoothing the direct current of said rectifier circuit means;

inverter means connected to said smoothing circuit means for conducting an alternating current in response to the direct current obtained at said smoothing circuit means;

a synchronous motor connected to said inverter means;

source voltage detecting means connected to said power supply for producing a voltage signal which is synchronous with a voltage of said power supply; and control circuit means including a first speed control means for controlling an interrupting operation of said switching element of said step-up chopper circuit means in a high speed region greater than a predetermined value, means for generating a deviation velocity signal by subtracting a detected speed of said synchronous motor from an instruction speed therefor, means for generating a current instruction signal for making the deviation velocity signal becomes zero, means for generating a synchronous current instruction signal by multiplying the current instruction signal and a voltage signal output from said source voltage detecting means, said first speed control means intermittently controlling said switching element of said step-up chopper circuit means based on a duty ratio necessary for making the synchronous current instruction signal coincide with said alternating current of said power supply, and a second speed control means for effecting pulse width modulation control of said inverter means so that the deviation velocity signal becomes 0 in a low speed region lower than said predetermined value.

3. A speed control apparatus for a brushless direct current motor according to claim 6, further comprising voltage detecting means disposed between said smoothing circuit means and said inverter means for detecting a voltage value, means for providing a set voltage selected to be a larger value than a peak value of said power supply voltage, comparator means for comparing the voltage value detected by said voltage detecting means and said set voltage and providing an output indicative thereof, said second speed control means being controlled to change the speed of said motor from said high speed region to said low speed region by said pulse width modulation of said inverter means when said comparator means provides an output indicating that the voltage detected by said voltage detecting means is lower than the said voltage, and said first speed control means being controlled to change the speed of said motor from said low speed region to said high speed region by said interruption of said switching element of said step-up chopper circuit means when a duty ratio of said inverter means reaches to 100%.

* * * * *